US012567531B2

(12) United States Patent
Tomohiro et al.

(10) Patent No.: US 12,567,531 B2
(45) Date of Patent: Mar. 3, 2026

(54) COIL COMPONENT

(71) Applicant: Murata Manufacturing Co., Ltd., Kyoto-fu (JP)

(72) Inventors: Takashi Tomohiro, Nagaokakyo (JP); Masaru Miyazaki, Nagaokakyo (JP); Yutaka Noguchi, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 786 days.

(21) Appl. No.: 17/816,927

(22) Filed: Aug. 2, 2022

(65) Prior Publication Data

US 2023/0053145 A1 Feb. 16, 2023

(30) Foreign Application Priority Data

Aug. 5, 2021 (JP) ................................ 2021-129225

(51) Int. Cl.
*H01F 5/00* (2006.01)
*H01F 27/255* (2006.01)
*H01F 27/28* (2006.01)

(52) U.S. Cl.
CPC ....... *H01F 27/2804* (2013.01); *H01F 27/255* (2013.01); *H01F 2027/2809* (2013.01)

(58) Field of Classification Search
CPC .................................................. H01F 27/2804
USPC ................................................. 336/200, 221
See application file for complete search history.

(56) References Cited

U.S. PATENT DOCUMENTS

| | | | | |
|---|---|---|---|---|
| 2006/0014303 | A1* | 1/2006 | Takazawa | H01F 17/0013 438/1 |
| 2014/0191838 | A1* | 7/2014 | Yoshida | H01F 27/2804 336/200 |
| 2014/0232504 | A1* | 8/2014 | Tachibana | H01F 27/292 336/200 |
| 2018/0005739 | A1* | 1/2018 | Orimo | C01G 37/02 |
| 2018/0374628 | A1* | 12/2018 | Yamauchi | H01F 27/24 |
| 2019/0214188 | A1* | 7/2019 | Imada | H01F 27/24 |

FOREIGN PATENT DOCUMENTS

| | | | |
|---|---|---|---|
| CN | 103503088 | A | 1/2014 |
| CN | 105097185 | A | 11/2015 |
| CN | 110033922 | A | 7/2019 |
| CN | 110310825 | A | 10/2019 |
| JP | 2017-073547 | A | 4/2017 |
| JP | 2017-228768 | A | 12/2017 |
| JP | 2018-006411 | A | 1/2018 |
| JP | 2018-121023 | A | 8/2018 |
| JP | 2019-125605 | A | 7/2019 |
| JP | 2023-023579 | A | 2/2023 |

* cited by examiner

*Primary Examiner* — Ronald Hinson
(74) *Attorney, Agent, or Firm* — Studebaker Brackett PLLC

(57) ABSTRACT

A multilayer coil component includes a base body containing magnetic metal particles, and a coil embedded in the base body. The coil includes a plurality of inner electrode layers containing silver, and the inner electrode layers include a first inner electrode layer having a high pore area ratio and a second inner electrode layer having a low pore area ratio.

18 Claims, 4 Drawing Sheets

COIL COMPONENT

CROSS-REFERENCE TO RELATED APPLICATION

This application claims benefit of priority to Japanese Patent Application No. 2021-129225, filed Aug. 5, 2021, the entire content of which is incorporated herein by reference.

BACKGROUND

Technical Field

The present disclosure relates to a coil component.

Background Art

A multilayer coil component including a magnetic material portion which contains magnetic metal powder is known. However, magnetic metal powder, which consists of conductive particles having iron or an iron alloy incorporated therein, cannot be directly used in a multilayer coil component. To address such a problem, there is known a method in which by heat-treating a multilayer body obtained by alternately applying a magnetic metal powder paste and a silver paste for coil conductors, an autoxidation film is formed on the surface of the magnetic metal powder to secure insulation, and at the same time, the magnetic metal powder and silver are fired, thereby obtaining a multilayer coil component, as described, for example, in Japanese Unexamined Patent Application Publication No. 2017-73547.

SUMMARY

The multilayer coil component obtained by a method such as the one described in Japanese Unexamined Patent Application Publication No. 2017-73547 has a problem in that cracks are likely to occur in magnetic metal layers.

Accordingly, the present disclosure to provide a multilayer coil component in which cracks are unlikely to occur and which includes a base body containing magnetic metal particles and a coil embedded in the base body.

The present disclosure includes the following embodiments.

[1] A multilayer coil component including a base body containing magnetic metal particles, and a coil embedded in the base body, in which the coil includes a plurality of inner electrode layers containing silver, and the inner electrode layers include a first inner electrode layer having a high pore area ratio and a second inner electrode layer having a low pore area ratio.

[2] The multilayer coil component according to item [1], in which the base body includes a magnetic material layer containing the magnetic metal particles, and the magnetic material layer includes a first magnetic material layer containing insulation-coated magnetic metal particles and a second magnetic material layer containing magnetic metal particles having an oxide film on their surfaces.

[3] The multilayer coil component according to item [2], in which each of two principal surfaces of the second inner electrode layer is in contact with the second magnetic material layer.

[4] The multilayer coil component according to item [1], in which the base body includes a magnetic material layer containing the magnetic metal particles and a low-permeability layer having a lower magnetic permeability than the magnetic material layer, and the low-permeability layer is located between the plurality of inner electrode layers.

[5] The multilayer coil component according to item [4], in which each of two principal surfaces of the second inner electrode layer is in contact with the low-permeability layer.

[6] The multilayer coil component according to item [4] or [5], in which the low-permeability layer is a non-magnetic ferrite layer.

[7] The multilayer coil component according to any one of items [1] to [6], in which at least one of a lowermost inner electrode layer and an uppermost inner electrode layer is the first inner electrode layer.

[8] The multilayer coil component according to any one of items [1] to [7], in which each of a lowermost inner electrode layer and an uppermost inner electrode layer is the first inner electrode layer.

[9] The multilayer coil component according to any one of items [1] to [8], in which the first inner electrode layer has a pore area ratio of 10% or more and 20% or less (i.e., from 10% to 20%), and the second inner electrode layer has a pore area ratio of 1% or more and 5% or less (i.e., from 1% to 5%).

According to the present disclosure, in a multilayer coil component including a base body containing magnetic metal particles and a coil embedded in the base body, the coil includes inner electrode layers including a first inner electrode layer having a high pore area ratio and a second inner electrode layer having a low pore area ratio, and thereby it is possible to provide a multilayer coil component in which cracks are unlikely to occur.

DETAILED DESCRIPTION

Figure 1:
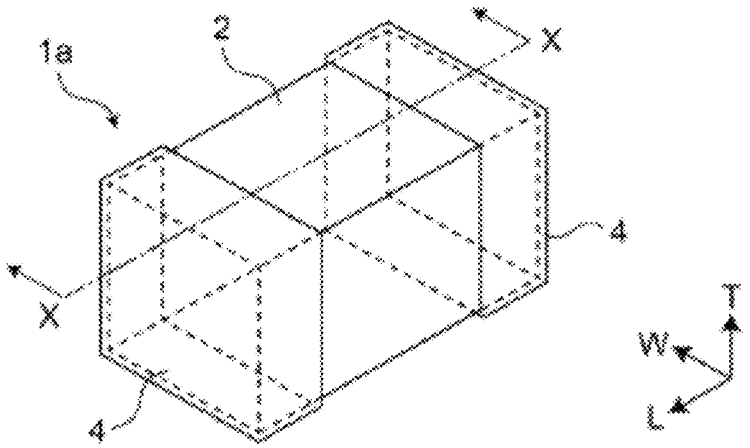
FIG. 1 is a perspective view schematically showing a multilayer coil component according to a first embodiment.

Multilayer coil components of the present disclosure will be described in detail with reference to the drawings. However, the multilayer coil components of the present disclosure and the shape, arrangement, and the like of the constituent elements are not limited to the examples shown. In the drawings, in some cases, members having the same function are denoted by the same reference signs. In view of the explanation of the main points or easiness of understanding, for convenience, descriptions will be made on separate embodiments. However, structures shown in different embodiments can be partially replaced or combined. In a subsequent embodiment, descriptions of the matters common to those in a preceding embodiment are omitted, and only the differences are described in some cases. In particular, the same operation and effect provided by the same structures are not mentioned specifically in each embodiment in some cases. The size, positional relationship, and the like of the members shown in some drawings are exaggerated to clarify the description.

First Embodiment

Figure 2:
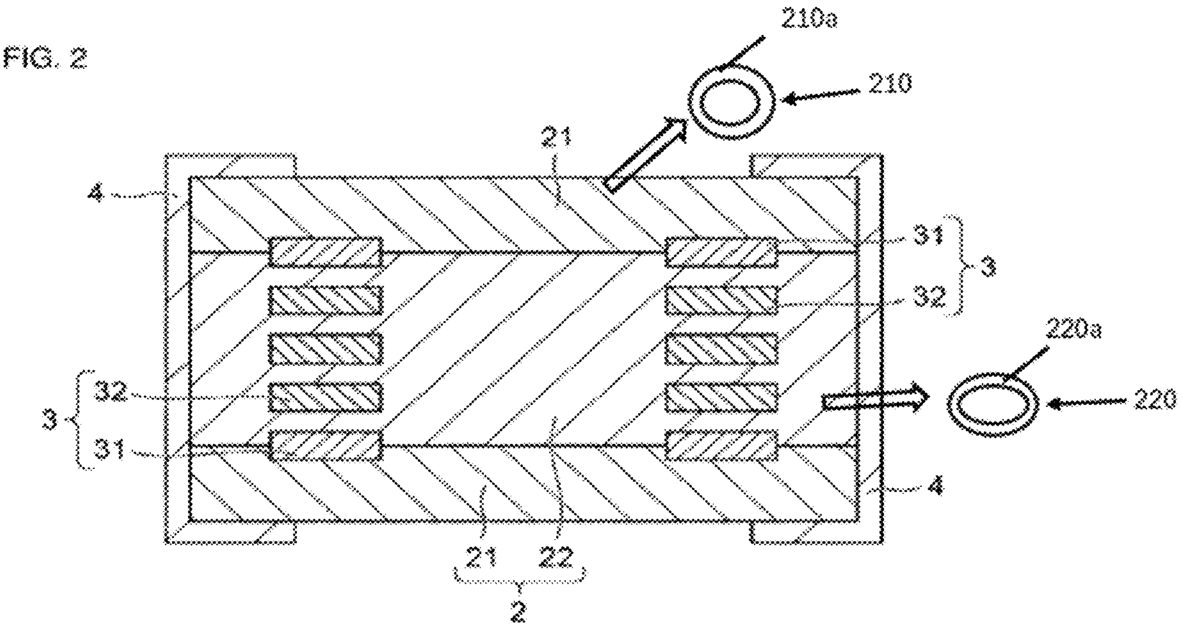
FIG. 2 is a cross-sectional view schematically showing a cross section of the multilayer coil component shown in FIG. 1, taken along the line X-X.

FIG. 1 is a perspective view of a multilayer coil component 1*a* according to this embodiment, and FIG. 2 is a cross-sectional view thereof.

As shown in FIGS. 1 and 2, the multilayer coil component 1*a* according to this embodiment has a substantially rectangular parallelepiped shape. The multilayer coil component 1*a* broadly includes a base body 2, a coil 3 embedded in the base body 2, and outer electrodes 4. The base body 2 includes first magnetic material layers 21 located in the upper and lower portions of the base body 2, and a second magnetic material layer 22 located therebetween. In FIG. 1, the T direction corresponds to the vertical direction. The coil 3 is embedded inside the base body 2. The coil 3 is formed by connecting a plurality of inner electrode layers with via conductors (not shown). The plurality of inner electrode layers include first inner electrode layers 31 located as the uppermost and lowermost layers of the inner electrode layers, and second inner electrode layers 32 located between the first inner electrode layers 31. The outer electrodes 4 are provided on both end surfaces (WT surfaces) of the base body 2. Each of the outer electrodes 4 extends from its corresponding end surface to parts of four adjacent surfaces. That is, the outer electrodes 4 are five-surface electrodes. The ends of the coil 3 are electrically connected to the outer electrodes 4 at the end surfaces of the base body 2.

As described above, in this embodiment, the base body 2 includes the first magnetic material layer 21 and the second magnetic material layer 22.

The first magnetic material layer 21 and the second magnetic material layer 22 contain magnetic metal particles.

The magnetic metal material constituting the magnetic metal particles is not particularly limited as long as it has magnetism, and for example is iron, cobalt, nickel, or gadolinium, or an alloy containing one or two or more of these. Preferably, the magnetic metal material is iron or an iron alloy. The iron may be iron only or an iron derivative, such as a complex. Such an iron derivative is not particularly limited, and for example is iron carbonyl which is an iron-CO complex, and preferably iron pentacarbonyl. Particularly preferable is hard grade iron carbonyl having an onion skin structure (structure including concentric spherical layers around the center of a particle) (e.g., hard grade iron carbonyl manufactured by BASF). The iron alloy is not particularly limited, and examples thereof include Fe—Si-based alloys, Fe—Si—Cr-based alloys, and Fe—Si—Al-based alloys. The alloys may further contain B, C, and the like as other secondary components. The content of the secondary components is not particularly limited, and for example the content may be 0.1% by mass or more and 5.0% by mass or less (i.e., from 0.1% by mass to 5.0% by mass), and preferably 0.5% by mass or more and 3.0% by mass or less (i.e., from 0.5% by mass to 3.0% by mass). The above-described magnetic metal materials may be used alone or in combination of two or more.

The magnetic metal particles have an average particle diameter of preferably 0.5 μm or more and 50 μm or less (i.e., from 0.5 μm to 50 μm), more preferably 1 μm or more and 30 μm or less (i.e., from 1 μm to 30 μm), and still more preferably 2 μm or more and 20 μm or less (i.e., from 2 μm to 20 μm). By setting the average particle diameter of the magnetic metal particles to be 0.5 μm or more, handling of the magnetic metal particles is facilitated. By setting the average particle diameter of the magnetic metal particles to be 50 μm or less, the filling factor of the magnetic metal particles can be increased, and the magnetic characteristics of the magnetic material layers are improved.

Here, the average particle diameter means an average of equivalent circle diameters of magnetic metal particles in a SEM (scanning electron microscope) image of a cross section of a magnetic material layer. For example, the average particle diameter can be obtained by the following method. A plurality of (for example, five) regions (for example, 130 μm×100 μm) in a cross section obtained by cutting the multilayer coil component 1*a* are photographed with a SEM. The resulting SEM images are analyzed by using image analysis software (e.g., A-ZO KUN (registered trademark) manufactured by Asahi Kasei Engineering Corporation) to obtain the equivalent circle diameters of 500 or more metal particles, and an average thereof is calculated.

The first magnetic material layer 21 contains insulation-coated magnetic metal particles 210 coated with an insulating film 210*a*.

The insulating film is a film other than an oxide film of a metal constituting the magnetic metal particles, i.e., a film other than an autoxidation film. Note that the magnetic metal particles are not prevented from having an autoxidation film.

In a preferred embodiment, the insulating film is a film containing a metal oxide, and preferably is a film of an oxide of Si.

Examples of a method of forming the insulating film include a mechanochemical method and a sol-gel method. In particular, in the case where a film of an oxide of Si is formed, a sol-gel method is preferable. When a film containing an oxide of Si is formed by the sol-gel method, a sol-gel coating agent containing a Si alkoxide and an organic chain-containing silane coupling agent are mixed, the resulting mixed solution is made to adhere to the surfaces of the magnetic metal particles, and heat treatment is performed to cause dehydration, followed by drying at a predetermined temperature. Thus, a film can be formed.

The insulating film may cover only some parts of the surfaces of the magnetic metal particles or may cover the entire surfaces of the magnetic metal particles. Furthermore, the shape of the insulating film is not particularly limited, and the insulating film may have a mesh shape or a layer shape. In a preferred embodiment, 50% or more, preferably 70% or more, more preferably 80% or more, still more preferably 90% or more, and particularly preferably 100% of the surfaces of the magnetic metal particles is covered with the insulating film. By covering the surfaces of the metal particles with the insulating film, an oxide film of such magnetic metal particles can be inhibited from forming on the surfaces of the magnetic metal particles. Furthermore, the specific resistance in the magnetic material layer can be increased.

The thickness of the insulating film is not particularly limited, but is preferably 1 nm or more and 100 nm or less (i.e., from 1 nm to 100 nm), more preferably 3 nm or more and 50 nm or less (i.e., from 3 nm to 50 nm), and still more preferably 5 nm or more and 30 nm or less (i.e., from 5 nm to 30 nm), and for example, can be 10 nm or more and 30 nm or less (i.e., from 10 nm to 30 nm) or 5 nm or more and 20 nm or less (i.e., from 5 nm to 20 nm). By increasing the thickness of the insulating film, an oxide film of the magnetic metal particles can be further inhibited from forming. On the other hand, by decreasing the thickness of the insulating film, the amount of the magnetic metal particles in the magnetic material layer can be increased, the magnetic characteristics of the magnetic material layer are improved, and miniaturization of the magnetic material layer can be easily achieved.

The second magnetic material layer 22 contains magnetic metal particles 220 having an oxide film 220*a*.

The oxide film is an oxide film of a metal constituting the magnetic metal particles, i.e., an autoxidation film.

The thickness of the oxide film is not particularly limited, but is preferably 1 nm or more and 100 nm or less (i.e., from 1 nm to 100 nm), more preferably 3 nm or more and 50 nm or less (i.e., from 3 nm to 50 nm), and still more preferably 5 nm or more and 30 nm or less (i.e., from 5 nm to 30 nm), and for example, can be 10 nm or more and 30 nm or less (i.e., from 10 nm to 30 nm) or 5 nm or more and 20 nm or less (i.e., from 5 nm to 20 nm). By increasing the thickness of the oxide film, the specific resistance of the magnetic material layer is improved. On the other hand, by decreasing the thickness of the oxide film, the amount of the magnetic metal particles in the magnetic material layer can be increased, the magnetic characteristics of the magnetic material layer are improved, and miniaturization of the magnetic material layer can be easily achieved.

In the second magnetic material layer 22, the magnetic metal particles are bound by the oxide film.

In the coil 3, a plurality of inner electrode layers are connected by via conductors (not shown).

The inner electrode layers contain a conductive material. The conductive material is silver, copper, or gold, or an alloy thereof. The inner electrode layers contain, as the conductive material, preferably silver, and more preferably silver only.

The thickness of the inner electrode layers is not particularly limited, but is preferably 15 μm or more and 45 μm or less (i.e., from 15 μm to 45 μm), and more preferably 20 μm or more and 40 μm or less (i.e., from 20 μm to 40 μm).

The inner electrode layers include a first inner electrode layer 31 having a high pore area ratio and a second inner electrode layer 32 having a low pore area ratio. Since the multilayer coil component of the present disclosure includes the first inner electrode layer having a high pore area ratio, internal stress is relaxed, and the occurrence of cracks is suppressed.

The pore area ratio of the first inner electrode layer is preferably 10% or more and 20% or less (i.e., from 10% to 20%), and more preferably 13% or more and 18% or less (i.e., from 13% to 18%).

The pore area ratio of the second inner electrode layer is preferably 1% or more and 5% or less (i.e., from 1% to 5%), and more preferably 1% or more and 3% or less (i.e., from 1% to 3%).

The difference between the pore area ratio of the first inner electrode layer and the pore area ratio of the second inner electrode layer is preferably 5% or more and 30% or less (i.e., from 5% to 30%), more preferably 10% or more and 20% or less (i.e., from 10% to 20%), and still more preferably 13% or more and 18% or less (i.e., from 13% to 18%).

The pore area ratio of the inner electrode layers can be obtained by the following method. A cross section of the coil is exposed by ion milling or the like. The resulting cross section is observed with an electron microscope, and an image of the entire cross section perpendicular to the length direction of the coil is obtained. The resulting image is subjected to binarization by using image analysis software (e.g., A-ZO KUN (registered trademark) manufactured by Asahi Kasei Engineering Corporation) to separate a pore portion from a silver portion, and the area ratio of the pore portion is calculated.

In this embodiment, the inner electrode layers include first inner electrode layers 31 located as uppermost and lowermost layers, and second inner electrode layers 32 located between the first inner electrode layers 31.

One principal surface (a principal surface located on the outer side) of the first inner electrode layer 31 is in contact with the first magnetic material layer 21, and another principal surface (a principal surface located on the inner side) is in contact with the second magnetic material layer 22. Here, the principal surface of the inner electrode layer refers to a surface perpendicular to the stacking direction.

Each of two principal surfaces of the second inner electrode layer 32 is in contact with the second magnetic material layer 22. Preferably, the second inner electrode layer 32 is wholly in contact with the second magnetic material layer 22.

In the multilayer coil component 1*a* according to this embodiment, the first inner electrode layer 31 having a relatively high pore area ratio is located as the outermost layer of the coil. Therefore, the occurrence of cracks can be suppressed near the outer side of the outermost inner electrode layer where cracks are likely to occur, and in the second magnetic material layer 22, since the magnetic metal particles are not insulation-coated with an insulating film, high magnetic characteristics can be obtained.

In FIG. 2, the cross-sectional shape of the inner electrode layer is shown as a rectangular shape. However, such a cross-sectional shape is the shape of the inner electrode layer shown schematically, and the cross-sectional shape is not limited thereto. For example, the cross-sectional shape of the inner electrode layer may be a distorted rectangular shape, for example, a substantially elliptic shape.

Each of the outer electrodes 4 extends from its corresponding end surface of the multilayer coil component 1*a* to parts of four adjacent surfaces, i.e., is a five-surface electrode. Each of the outer electrodes 4 is electrically connected to an end of the coil 3 at the end surface of the base body 2.

The outer electrode 4 is formed of a conductive material, preferably at least one metal material selected from the group consisting of Au, Ag, Pd, Ni, Sn, and Cu.

The outer electrode 4 may be single-layered or multi-layered. In an embodiment, in the case where the outer electrode is multi-layered, the outer electrode can include a layer containing Ag or Pd, a layer containing Ni, or a layer containing Sn. In a preferred embodiment, the outer electrode includes a layer containing Ag or Pd, a layer containing Ni, and a layer containing Sn. Preferably, the layer containing Ag or Pd, the layer containing Ni, and the layer containing Sn are provided in that order from the coil conductor side. Preferably, the layer containing Ag or Pd is a layer formed by baking a Ag paste or Pd paste, and the layer containing Ni and the layer containing Sn can be plating layers.

The thickness of the outer electrode 4 is not particularly limited and, for example, can be 1 μm or more and 20 μm or less (i.e., from 1 μm to 20 μm), and preferably 5 μm or more and 10 μm or less (i.e., from 5 μm to 10 μm).

Second Embodiment

Figure 3:
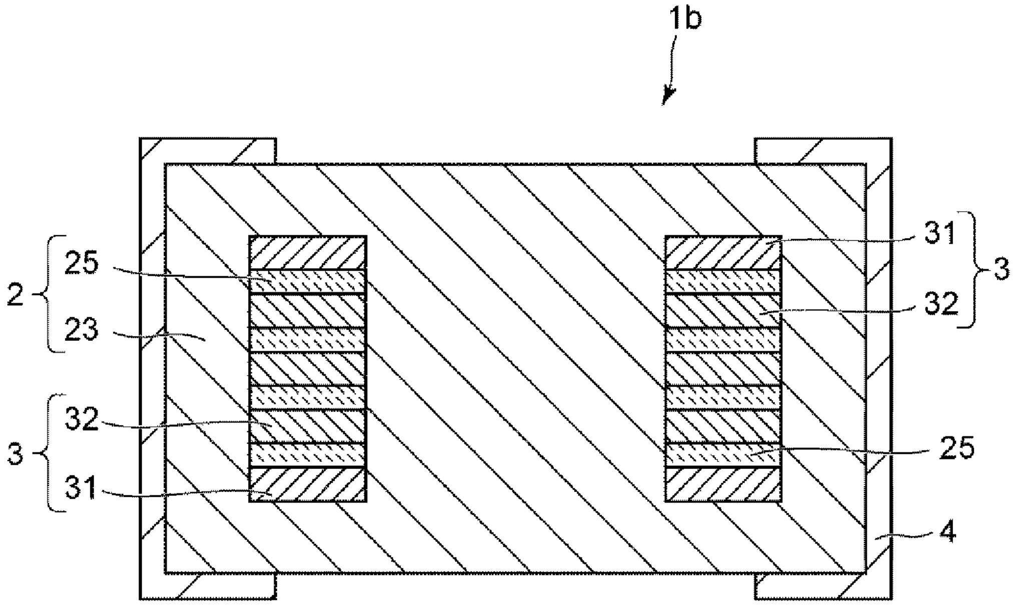
FIG. 3 is a cross-sectional view schematically showing a cross section of a multilayer coil component according to a second embodiment.

FIG. 3 is a cross-sectional view of a multilayer coil component 1*b* according to this embodiment. Note that a perspective view of the multilayer coil component 1*b* is the same as the perspective view of the multilayer coil component 1*a*.

As shown in FIG. 3, the multilayer coil component 1*b* according to this embodiment has a substantially rectangular parallelepiped shape. The multilayer coil component 1*b* broadly includes a base body 2, a coil 3 embedded in the base body 2, and outer electrodes 4. The base body 2 includes a magnetic material layer 23 and low-permeability layers 25 located between inner electrode layers. The coil 3 is embedded inside the base body 2. The coil 3 is formed by connecting a plurality of inner electrode layers with via conductors (not shown). The plurality of inner electrode layers include first inner electrode layers 31 located as the uppermost and lowermost layers of the inner electrode layers, and second inner electrode layers 32 located between the first inner electrode layers 31. The outer electrodes 4 are provided on both end surfaces (WT surfaces) of the base body 2. Each of the outer electrodes 4 extends from its corresponding end surface to parts of four adjacent surfaces. That is, the outer electrodes 4 are five-surface electrodes. The ends of the coil 3 are electrically connected to the outer electrodes 4 at the end surfaces of the base body 2.

The magnetic material layer 23 has the same structure as that of the first magnetic material layer 21 in the first embodiment. That is, the magnetic material layer 23 contains insulation-coated magnetic metal particles coated with an insulating film.

The low-permeability layer 25 is a layer having a lower magnetic permeability than the magnetic material layer 23, and can contain non-magnetic ferrite, low-magnetic ferrite, glass, or metal particles having a small particle diameter.

The low-permeability layer 25 is preferably an oxide layer, and more preferably a non-magnetic ferrite layer.

The non-magnetic ferrite constituting the non-magnetic ferrite layer can be, for example, a composite oxide containing two or more metals selected from Zn, Cu, Mn, and Fe.

The non-magnetic ferrite can be, for example, a non-magnetic ferrite which contains 40 mol % or more and 49.5 mol % or less (i.e., from 40 mol % to 49.5 mol %) of Fe in terms of $Fe_2O_3$, and 6 mol % or more and 13 mol % or less (i.e., from 6 mol % to 13 mol %) of Cu in terms of CuO, with the balance being ZnO.

The non-magnetic ferrite may contain, as necessary, additives such as Mn, Sn, Co, Bi, and Si, in one kind or in any combination of two or more kinds, and/or may contain minute amounts of unavoidable impurities.

As in the multilayer coil component 1*a*, the inner electrode layers include a first inner electrode layer 31 having a high pore area ratio and a second inner electrode layer 32 having a low pore area ratio.

One principal surface (a principal surface located on the outer side) of the first inner electrode layer 31 is in contact with the magnetic material layer 23, and another principal surface (a principal surface located on the inner side) is in contact with the low-permeability layer 25.

Each of two principal surfaces of the second inner electrode layer 32 is in contact with the low-permeability layer 25. In this embodiment, side surfaces of the second inner electrode layer 32 are in contact with the magnetic material layer 23.

In the multilayer coil component 1*b* according to this embodiment, the first inner electrode layer 31 having a relatively high pore area ratio is located as the outermost layer of the coil. Therefore, the occurrence of cracks can be suppressed in the magnetic material layer near the outer side of the outermost inner electrode layer where cracks are likely to occur. Furthermore, since the low-permeability layer 25 is present between the inner electrode layers, DC superposition characteristics are improved.

In FIG. 3, the cross-sectional shape of the inner electrode layer is shown as a rectangular shape. However, such a cross-sectional shape is the shape of the inner electrode layer shown schematically, and the cross-sectional shape is not limited thereto. For example, the cross-sectional shape of the inner electrode layer may be a distorted rectangular shape, for example, a substantially elliptic shape. Furthermore, although the low-permeability layer 25 is correspondingly in contact with the principal surface of the inner electrode layer, the arrangement is not limited thereto. For example, it may be acceptable that the low-permeability layer 25 is not in contact with the periphery of the principal surface of the inner electrode layer.

The multilayer coil components of the present disclosure have been described above on the basis of the embodiments. However, the multilayer coil components of the present disclosure are not limited to the embodiments described above, and various changes can be made.

In an embodiment, the multilayer coil component of the present disclosure, excluding the outer electrodes 4, may be covered with a protective layer. By providing the protective layer, when mounted on a substrate or the like, short-circuiting with other electronic components can be prevented.

Examples of the insulating material constituting the protective layer include resin materials having high electrical insulation properties, such as acrylic resins, epoxy resins, and polyimides.

In an embodiment, the low-permeability layer 25 in the second embodiment may cover the entire surface of the second inner electrode layer 32.

In an embodiment, the low-permeability layer 25 in the second embodiment may extend, beyond the range where the inner electrode layer is present, toward the side surface of the base body. For example, the low-permeability layer 25 may extend to the side surface of the base body 2 and may be exposed from the side surface of the base body 2.

Next, a method for manufacturing a multilayer coil component of the present disclosure will be described.

A multilayer coil component of the present disclosure can be obtained by stacking a magnetic material paste, a conductor paste, and as necessary, a low-permeability paste having a lower magnetic permeability than the magnetic material paste, and heat-treating the stacked pastes.

More specifically, a multilayer coil component 1*a* according to the first embodiment can be manufactured as follows.

As a first magnetic material paste, a magnetic material paste containing insulation-coated magnetic metal particles coated with an insulating film is prepared.

Magnetic metal particles with a D50 (volume-based cumulative 50% particle diameter) of 2 μm or more and 20 μm or less (i.e., from 2 μm to 20 μm) are prepared. Next, an insulating film is formed on the surfaces of the magnetic metal particles by a mechanochemical method, a sol-gel method, or the like to perform insulation coating. The insulated magnetic metal particles are mixed with cellulose or polyvinyl butyral serving as a binder, and a mixture of terpineol or butyl diglycol acetate serving as a solvent, followed by kneading to obtain a first magnetic material paste.

As a second magnetic material paste, a magnetic material paste containing magnetic metal particles which are not insulation-coated is prepared. The second magnetic material paste can be obtained in the same manner as in the first magnetic material paste except that the magnetic metal particles are not insulation-coated.

As a conductor paste, a conductor paste such as a silver paste is prepared.

Figure 4A:
FIGS. 4A to 4G are views illustrating a method of producing the multilayer coil component according to the first embodiment.

Next, a multilayer body of the pastes is produced. First, a substrate in which a thermal release sheet and a film of polyethylene terephthalate or the like are stacked on a support is prepared. The first magnetic material paste is applied thereon by screen printing a predetermined number of times to form a first magnetic material paste printing layer 51 (FIG. 4A).

Figure 4B:
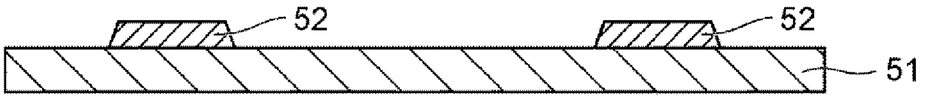

Next, a conductor paste printing layer 52 is formed on the printing layer 51 (FIG. 4B).

Figure 4C:
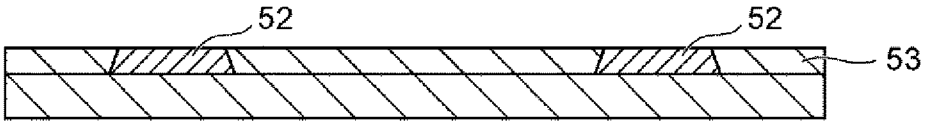

Next, a first magnetic material paste printing layer 53 is formed on the printing layer 51 in the region where the conductor paste printing layer 52 is not formed (FIG. 4C).

Figure 4D:

Next, a second magnetic material paste printing layer 54 is formed entirely on the printing layers 52 and 53 (FIG. 4D).

Figure 4E:
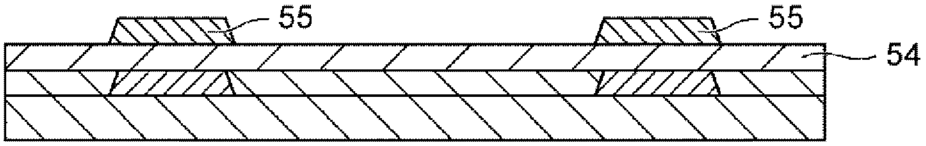

Next, a conductor paste printing layer 55 is formed on the printing layer 54 (FIG. 4E).

Figure 4F:
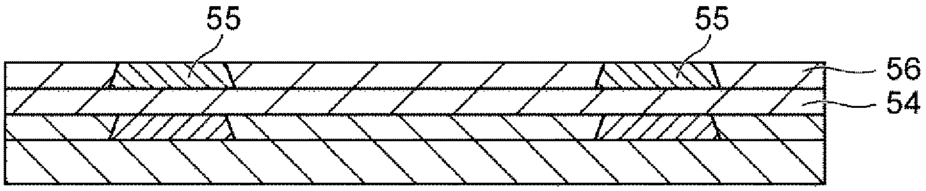

Next, a second magnetic material paste printing layer 56 is formed on the printing layer 54 in the region where the conductor paste printing layer 55 is not formed (FIG. 4F).

Figure 4G:
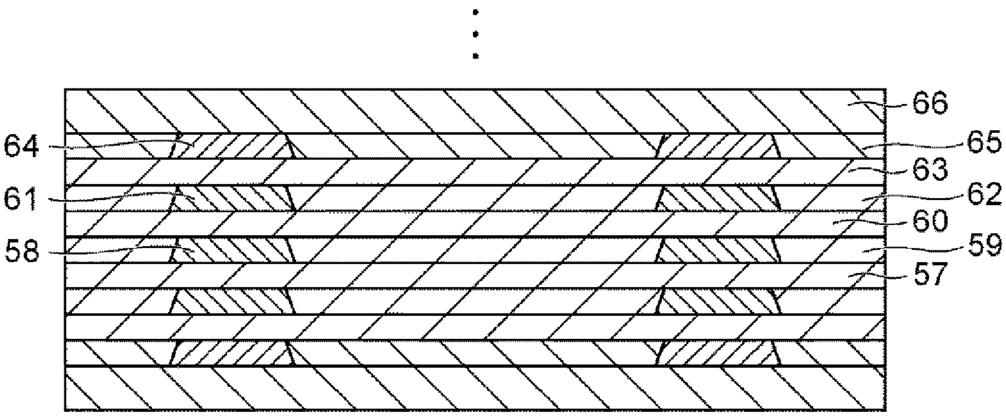

Next, by repeating the steps shown in FIGS. 4D to 4F, a second magnetic material paste printing layer 57, a conductor paste printing layer 58, a second magnetic material paste printing layer 59, a second magnetic material paste printing layer 60, a conductor paste printing layer 61, a second magnetic material paste printing layer 62, and a second magnetic material paste printing layer 63 are formed, and by the same steps as those shown in FIG. 4B and FIG. 4A, a conductor paste printing layer 64, a first magnetic material paste printing layer 65, and a first magnetic material paste printing layer 66 are formed. Thus, a multilayer body of the pastes is obtained (FIG. 4G). The resulting multilayer body is compressed under pressure to produce a multilayer body block. The first magnetic material paste printing layers 51, 53, 65, and 66 constitute first magnetic material layers 21 of the multilayer coil component 1*a*. The second magnetic material paste printing layers 54, 56, 57, 59, 60, 62, and 63 constitute a second magnetic material layer 22 of the multilayer coil component 1*a*. The conductor paste printing layers 52 and 64 constitute first inner electrode layers 31 of the multilayer coil component 1*a*. The conductor paste printing layers 55, 58, and 61 constitute second inner electrode layers 32 of the multilayer coil component 1*a*.

Next, the resulting multilayer body block is singulated by cutting with a dicer or the like, followed by degreasing and firing in a firing furnace. Note that singulation may be performed after firing.

The firing temperature is preferably 600° C. or higher and 800° C. or lower (i.e., from 600° C. to 800° C.), and more preferably 650° C. or higher and 750° C. or lower (i.e., from 650° C. to 750° C.).

The firing time is preferably 30 minutes or more and 90 minutes or less (i.e., from 30 minutes to 90 minutes), and more preferably 40 minutes or more and 80 minutes or less (i.e., from 40 minutes to 80 minutes).

The firing is performed preferably in the air.

An oxide film is formed by the firing on the surfaces of the magnetic metal particles contained in the magnetic material paste. At this time, under the influence of such an oxide film, decomposition of organic components in the silver paste is accelerated, and the inner electrode layer in the vicinity of the magnetic metal particles contracts. As a result, the pore area ratio of the inner electrode layer is decreased. The influence of such an oxide film increases in the region in contact with the second magnetic material paste containing magnetic metal particles which are not insulation-coated, in which an oxide film is more likely to occur. As a result, the inner electrode layer formed of the conductor paste sandwiched between the second magnetic material pastes has a low pore area ratio compared with the other inner electrode layers.

Next, by forming outer electrodes on the end surfaces of the fired base body, a multilayer coil component 1*a* can be obtained.

A multilayer coil component 1*b* according to the second embodiment can be manufactured as in the multilayer coil component 1*a* except for formation of the multilayer body block described below.

In addition to the first magnetic material paste and the conductor paste, a low-permeability paste is prepared.

The low-permeability paste can be obtained by mixing low-permeability particles having a lower magnetic permeability than the magnetic metal particles, for example, ferrite particles, with cellulose or polyvinyl butyral serving as a binder, and a mixture of terpineol or butyl diglycol acetate serving as a solvent, followed by kneading.

Figure 5A:
FIGS. 5A to 5H are views illustrating a method of producing the multilayer coil component according to the second embodiment.

Next, a multilayer body of the pastes is produced. First, a substrate in which a thermal release sheet and a film of polyethylene terephthalate or the like are stacked on a support is prepared. The first magnetic material paste is applied thereon by screen printing a predetermined number of times to form a first magnetic material paste printing layer 71 (FIG. 5A).

Figure 5B:
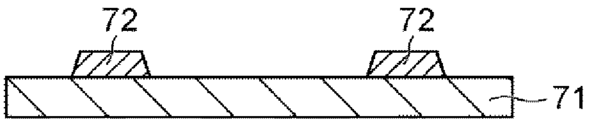

Next, a conductor paste printing layer 72 is formed on the printing layer 71 (FIG. 5B).

Figure 5C:
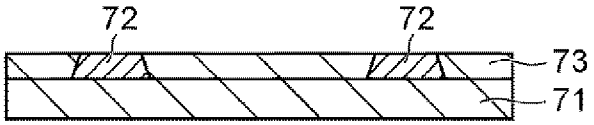

Next, a first magnetic material paste printing layer 73 is formed on the printing layer 71 in the region where the conductor paste printing layer 72 is not formed (FIG. 5C).

Figure 5D:
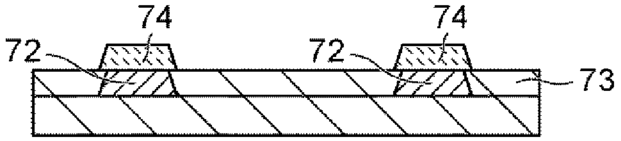

Next, a low-permeability paste printing layer 74 is formed on the printing layer 72 (FIG. 5D).

Figure 5E:
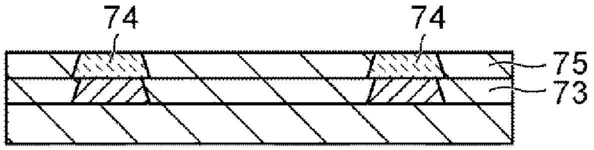

Next, a first magnetic material paste printing layer 75 is formed on the printing layer 73 in the region where the low-permeability paste printing layer 74 is not formed (FIG. 5E).

Figure 5F:
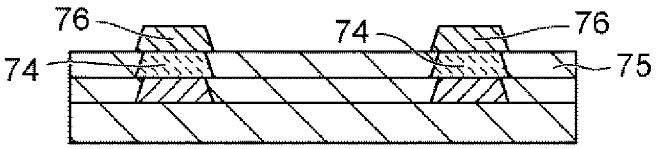

Next, a conductor paste printing layer 76 is formed on the printing layer 74 (FIG. 5F).

Figure 5G:
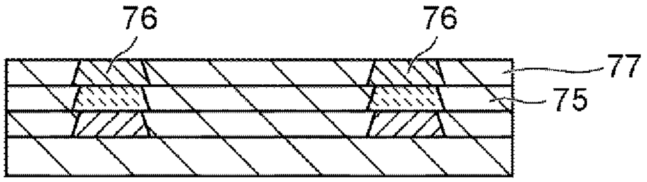

Next, a first magnetic material paste printing layer 77 is formed on the printing layer 75 in the region where the conductor paste printing layer 76 is not formed (FIG. 5G).

Figure 5H:
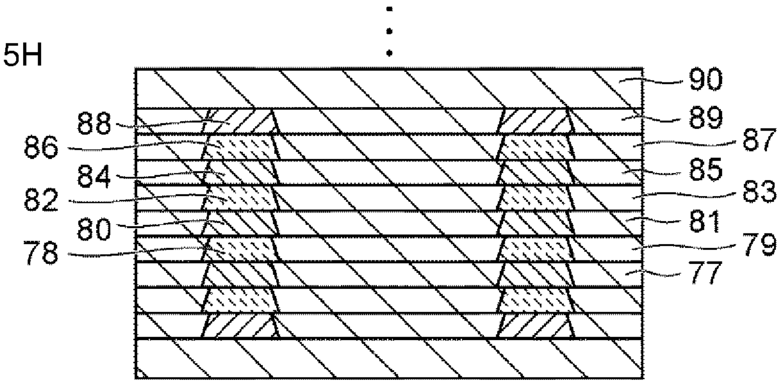

Next, by repeating the steps shown in FIGS. 5D to 5G, a low-permeability paste printing layer 78, a first magnetic material paste printing layer 79, a conductor paste printing layer 80, a first magnetic material paste printing layer 81, a low-permeability paste printing layer 82, a first magnetic material paste printing layer 83, a conductor paste printing layer 84, a first magnetic material paste printing layer 85, a low-permeability paste printing layer 86, a first magnetic material paste printing layer 87, a conductor paste printing layer 88, a first magnetic material paste printing layer 89, and a first magnetic material paste printing layer 90 are formed. Thus, a multilayer body of the pastes is obtained (FIG. 5H). The resulting multilayer body is compressed under pressure to produce a multilayer body block. The conductor paste printing layers 72 and 88 constitute first inner electrode layers 31 of the multilayer coil component 1*b*. The conductor paste printing layers 76, 80, and 84 constitute second inner electrode layers 32 of the multilayer coil component 1*b*. The first magnetic material paste printing layers 71, 73, 75, 77, 79, 81, 83, 85, 87, 89, and 90 constitute a magnetic material layer 23 of the multilayer coil component 1*b*. The low-permeability paste printing layers 74, 78, 82, and 86 constitute low-permeability layers 25 of the multilayer coil component 1*b*.

In the multilayer body, during firing, under the influence of oxides contained in the low-permeability particles, decomposition of organic components in the conductor paste is accelerated, and the inner electrode layer in the vicinity of the low-permeability particles contracts. As a result, the pore area ratio of such an inner electrode layer is decreased. On the other hand, an oxide film is formed by the firing on the surfaces of the magnetic metal particles contained in the magnetic material paste. However, since the magnetic metal particles are insulation-coated with an insulating film, the influence of the oxide film on the decomposition of organic components in the conductor paste is small. As a result, the inner electrode layer formed of the conductor paste sandwiched between the low-permeability pastes has a low pore area ratio compared with the other inner electrode layers.

The present disclosure will be described below on the basis of Examples. However, it is to be understood that the present disclosure is not limited to only such Examples.

EXAMPLES

Example 1

Preparation of First Magnetic Material Paste

Magnetic metal particles of an Fe—Si alloy with a D50 of 10 μm were prepared, and the surface of the magnetic metal powder was insulation-coated with an insulating film containing Si by a sol-gel method or the like. Cellulose serving as a binder and a mixture of terpineol and butyl diglycol acetate serving as a solvent were added to the insulation-coated magnetic metal particles, followed by kneading to prepare a first magnetic material paste.

Preparation of Second Magnetic Material Paste

Cellulose serving as a binder and a mixture of terpineol and butyl diglycol acetate serving as a solvent were added to magnetic metal particles which were not insulation-coated, followed by kneading to prepare a second magnetic material paste.

Preparation of Conductor Paste

Cellulose serving as a binder and a mixture of terpineol and butyl diglycol acetate serving as a solvent were added to silver powder, followed by kneading to prepare a conductor paste.

Production of Multilayer Body Block

On a substrate in which a thermal release sheet and a polyethylene terephthalate film were stacked on a metal plate, layers were formed using the first magnetic material paste, the second magnetic material paste, and the conductor paste, and a multilayer body shown in FIG. 4G was produced. The resulting multilayer body was compressed under pressure to produce a multilayer body block.

Production of Multilayer Coil Component

The multilayer body block obtained as described above was singulated by cutting with a dicer. The singulated multilayer body was degreased, and then fired in a firing furnace in the air at 700° C. for 60 minutes. Subsequently, a silver paste for outer electrodes containing silver powder, a glass component, and varnish was applied to the end surfaces of the fired base body, followed by baking at 700° C. to form underlying electrodes. Next, the component was immersed in an epoxy resin so that the component was impregnated with the epoxy resin, and thermal curing was performed. Finally, a Ni layer and a Sn layer were formed by electrolytic plating on the underlying electrodes to form outer electrodes. Thus, a multilayer coil component was obtained. The resulting multilayer coil component had a length of 1.6 mm, a width of 0.8 mm, and a height of 0.6 mm.

Example 2

Preparation of Non-Magnetic Ferrite Paste

A starting material mixture of $Fe_2O_3$, ZnO, and CuO, together with pure water and PSZ (partially stabilized zirconia) balls, was placed in a ball mill, and wet mixing and pulverization were performed for 6 hours. Subsequently, after water was evaporated to dryness, calcination was performed at a temperature of 750° C. for 3 hours, to thereby obtain calcined powder. Cellulose serving as a binder and a mixture of terpineol and butyl diglycol acetate serving as a solvent were added to the calcined powder, followed by kneading to prepare a non-magnetic ferrite paste.

Production of Multilayer Body Block

On a substrate in which a thermal release sheet and a polyethylene terephthalate film were stacked on a metal plate, layers were formed using the first magnetic material paste, the non-magnetic ferrite paste, and the conductor paste, and a multilayer body shown in FIG. 5H was produced. The resulting multilayer body was compressed under pressure to produce a multilayer body block.

Production of Multilayer Coil Component

A multilayer coil component was obtained as in Example 1. The resulting multilayer coil component had a length of 1.6 mm, a width of 0.8 mm, and a height of 0.6 mm.

Comparative Example 1

A multilayer coil component of Comparative Example 1 was produced as in Example 1 except that a second magnetic material paste was used instead of the first magnetic material paste, i.e., except that the second magnetic material paste was used for every magnetic material paste.

Evaluation (Pore Area Ratio)

In each of the multilayer coil components of Examples 1 and 2 and the multilayer coil component of Comparative Example 1, a cross section of the coil was exposed by grinding to ½ of the length in the L direction by ion milling. The resulting cross section was observed with an electron microscope, and an image of the entire cross section of the inner electrode layer was obtained. The resulting entire image was subjected to binarization by using image analysis software (A-ZO KUN (registered trademark) manufactured by Asahi Kasei Engineering Corporation) to separate a pore portion from a silver portion, for each of an outermost inner electrode layer and a middle inner electrode layer, and the area ratio of the pore portion was calculated. Thus, the pore area ratio was calculated. In each of Example 1, Example 2, and Comparative Example 1, the pore area ratios of 10 samples were calculated. The average value thereof is shown in Table 1.

(Crack Test)

For 10 samples each, the occurrence or non-occurrence of cracks was checked, and the crack occurrence rate was calculated. The results are shown in Table 1.

TABLE 1

| Sample | Pore area ratio (%) Outermost layer | Middle layer | Crack occurrence rate (%) |
|---|---|---|---|
| Comparative Example 1 | 2 | 2 | 5/10 |
| Example 1 | 16 | 2 | 0/10 |
| Example 2 | 15 | 2 | 0/10 |

Multilayer coil components of the present disclosure can be used, as inductors and the like, widely in various applications.

What is claimed is:

1. A multilayer coil component comprising:

a base body containing magnetic metal particles; and a coil embedded in the base body, wherein the coil includes a plurality of inner electrode layers containing silver, the inner electrode layers include a first inner electrode layer having a high pore area ratio and a second inner electrode layer having a low pore area ratio lower than the high pore area ratio, each of a lowermost inner electrode layer and an uppermost inner electrode layer is the first inner electrode layer, and the first inner electrode layer has a pore area ratio of from 10% to 20%, and the second inner electrode layer has a pore area ratio of from 1% to 5%.

2. The multilayer coil component according to claim 1, wherein at least one of a lowermost inner electrode layer and an uppermost inner electrode layer is the first inner electrode layer.

3. The multilayer coil component according to claim 1, wherein the base body includes a magnetic material layer containing the magnetic metal particles, and the magnetic material layer includes a first magnetic material layer containing insulation-coated magnetic metal particles and a second magnetic material layer containing magnetic metal particles having an oxide film on their surfaces.

4. The multilayer coil component according to claim 3, wherein each of two principal surfaces of the second inner electrode layer is in contact with the second magnetic material layer.

5. The multilayer coil component according to claim 4, wherein at least one of a lowermost inner electrode layer and an uppermost inner electrode layer is the first inner electrode layer.

6. The multilayer coil component according to claim 4, wherein each of a lowermost inner electrode layer and an uppermost inner electrode layer is the first inner electrode layer.

7. The multilayer coil component according to claim 4, wherein the first inner electrode layer has a pore area ratio of from 10% to 20%, and the second inner electrode layer has a pore area ratio of from 1% to 5%.

8. The multilayer coil component according to claim 3, wherein at least one of a lowermost inner electrode layer and an uppermost inner electrode layer is the first inner electrode layer.

9. The multilayer coil component according to claim 3, wherein each of a lowermost inner electrode layer and an uppermost inner electrode layer is the first inner electrode layer.

10. The multilayer coil component according to claim 3, wherein the first inner electrode layer has a pore area ratio of from 10% to 20%, and the second inner electrode layer has a pore area ratio of from 1% to 5%.

11. The multilayer coil component according to claim 1, wherein the base body includes a magnetic material layer containing the magnetic metal particles and a low-permeability layer having a lower magnetic permeability than the magnetic material layer, and the low-permeability layer is located between the plurality of inner electrodes layers.

12. The multilayer coil component according to claim 11, wherein each of two principal surfaces of the second inner electrode layer is in contact with the low-permeability layer.

13. The multilayer coil component according to claim 12, wherein the low-permeability layer is a non-magnetic ferrite layer.

14. The multilayer coil component according to claim 12, wherein at least one of a lowermost inner electrode layer and an uppermost inner electrode layer is the first inner electrode layer.

15. The multilayer coil component according to claim 11, wherein the low-permeability layer is a non-magnetic ferrite layer.

16. The multilayer coil component according to claim 11, wherein at least one of a lowermost inner electrode layer and an uppermost inner electrode layer is the first inner electrode layer.

17. The multilayer coil component according to claim 11, wherein each of a lowermost inner electrode layer and an uppermost inner electrode layer is the first inner electrode layer.

18. The multilayer coil component according to claim 11, wherein the first inner electrode layer has a pore area ratio of from 10% to 20%, and the second inner electrode layer has a pore area ratio of from 1% to 5%.

* * * * *